United States Patent
Cepulis (10) Patent No.: US 9,395,787 B2
(45) Date of Patent: Jul. 19, 2016

(54) SYSTEMS AND METHODS OF COMPONENT VOLTAGE ADJUSTMENT

(75) Inventor: Darren J. Cepulis, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 1367 days.

(21) Appl. No.: 12/918,388

(22) PCT Filed: Feb. 21, 2008

(86) PCT No.: PCT/US2008/054538
§ 371 (c)(1),
(2), (4) Date: Aug. 19, 2010

(87) PCT Pub. No.: WO2009/105103
PCT Pub. Date: Aug. 27, 2009

(65) Prior Publication Data
US 2011/0078466 A1    Mar. 31, 2011

(51) Int. Cl.
*G06F 1/00* (2006.01)
*G06F 1/32* (2006.01)

(52) U.S. Cl.
CPC ............ *G06F 1/3203* (2013.01); *G06F 1/3296* (2013.01); *Y02B 60/1285* (2013.01)

(58) Field of Classification Search
USPC .................................. 713/300–340; 710/107
See application file for complete search history.

(56) References Cited

U.S. PATENT DOCUMENTS

| | | |
|---|---|---|
| 6,615,360 B1 | 9/2003 | Amini et al. |
| 6,754,837 B1 * | 6/2004 | Helms ........................... 713/322 |
| 6,944,783 B2 | 9/2005 | Yu et al. |
| 7,064,955 B2 | 6/2006 | Harris et al. |
| 7,162,656 B2 | 1/2007 | Vogman |
| 7,237,129 B2 | 6/2007 | Fung |
| 7,257,721 B2 | 8/2007 | Chung et al. |
| 2006/0168461 A1 | 7/2006 | Allen |
| 2006/0181857 A1 | 8/2006 | Belady et al. |

FOREIGN PATENT DOCUMENTS

| | | | |
|---|---|---|---|
| CN | 1608239 | 4/2005 | |
| CN | 1877492 | 12/2006 | |
| CN | 101002159 | 7/2007 | |
| EP | 1736851 | * 12/2006 | ................... 713/300 |
| KR | 10-2005-0032802 | 4/2005 | |
| WO | WO 2005/010736 | 2/2005 | |
| WO | WO2005010736 | 2/2005 | |
| WO | WO 2006/068817 | 6/2006 | |

OTHER PUBLICATIONS

International Search Report and Written Opinion, dated Nov. 8, 2008, 11 pages.

* cited by examiner

*Primary Examiner* — Tim T Vo
*Assistant Examiner* — Kim T. Huynh
(74) *Attorney, Agent, or Firm* — Thomas, Kayden, Horstemeyer & Risley, LLP (57) ABSTRACT

Systems and methods for adjusting component voltage are disclosed. One example method includes: reading, over a control bus, a present value of voltage supplied to a component; comparing the present value of the voltage component to a predetermined minimum voltage associated with the component; and writing, over the control bus, a current setting that affects voltage provided to the component, wherein the writing is responsive to the comparison.

22 Claims, 7 Drawing Sheets

| TABLE | 500 |
|---|---|
| Table Signature | 510 |
| Table Length | 520 |
| Table Revision | 530 |
| Num. Module Descriptors | 540 |
| Offset of 1st Module Descriptor | 550 |
| Offset of 2nd Module Descriptor | 550 |
| ... | 550 |

FIG. 6

| MODULE DESCRIPTOR | 410 |
|---|---|
| Module Revision | 605 |
| Offset of Master Device Descriptor | 610 |
| Module Address Info | 615 |
| Offset of Init Descriptor | 620 |
| Module Output Units | 625 |
| Part Identifier | 630 |
| Offset of Current Stepping Descriptor | 635 |
| Module Reference Value | 640 |
| Offset for Voltmeter ADC Descriptor | 645 |
| Module Identifier String | 650 |

| MASTER DEVICE DESCRIPTOR | 420 |
|---|---|
| Bus Software Interface | 655 |

FIG. 7

| INITIALIZATION DESCRIPTOR | 430 |
|---|---|
| Initialization Revision | 710 |
| Num. Address Pairs | 720 |
| Address Pair 1 (Address, Data) | 730 |
| Address Pair 2 (Address, Data) | 730 |
| ... | 730 |

FIG. 8

| CURRENT STEPPING DESCRIPTOR | 440 |
|---|---|
| Stepping Revision | 810 |
| Num. Stepping Pairs | 820 |
| Stepping Pair 1 (Fraction, Current) | 830 |
| Stepping Pair 2 (Fraction, Current) | 830 |
| ... | 830 |

FIG. 9

| VOLTMETER ADC DESCRIPTOR | 440 |
|---|---|
| Voltmeter Revision | 910 |
| Offset forMaster Device Descriptor | 920 |
| Meter Address Info | 930 |
| Offset ffor Meter initiliazation Entry | 940 |
| Meter Units | 950 |
| Meter Reference Voltage | 960 |
| Meter Reading Multiplier | 970 |

FIG. 10

SYSTEMS AND METHODS OF COMPONENT VOLTAGE ADJUSTMENT

BACKGROUND

Existing solutions for reducing power in a computer system achieve power savings by reducing computing power. Such solutions move components to reduced-power/compute states based on utilization. That is, power management logic moves a component (e.g., disk drive) that has not been used recently, or a component that is idle (e.g., processor), to a reduced-power/compute state. However, moving between power states takes some period of time, so latency is incurred, and the system is therefore not always in an optimal state for power usage or compute efficiency.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
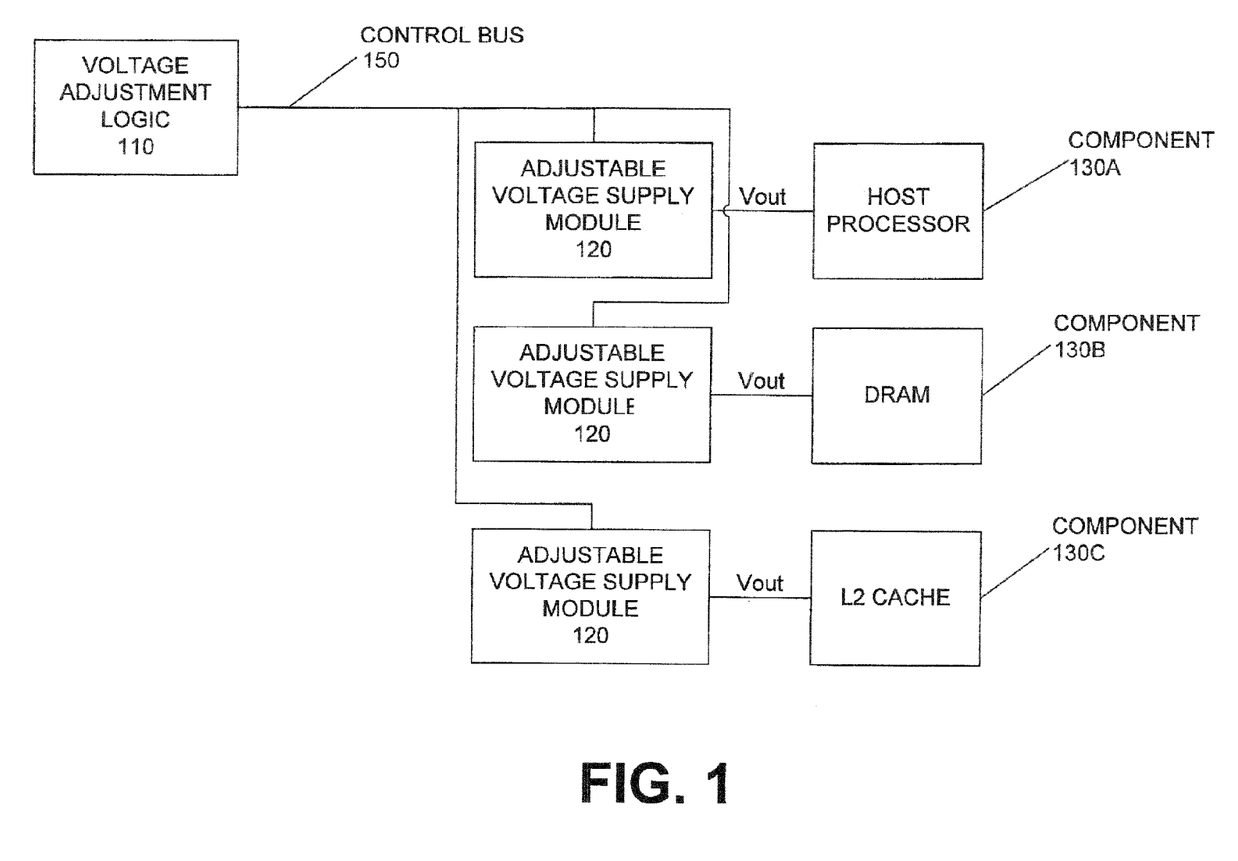
FIG. 1 is a block diagram of a computer system in accordance with one embodiment of component voltage adjustment logic.

The embodiments disclosed herein provide systems and methods for component voltage adjustment. In one such embodiment, FIG. 1 is a block diagram of a computer system in accordance with one embodiment of component voltage adjustment logic. System 100 includes voltage adjustment logic 110, one or more adjustable voltage supply modules 120 and one or more components 130. In this example embodiment, component 130A is a host processor, component 130B is dynamic RAM, and component 130C is a level-two cache, but many components are contemplated. Voltage adjustment logic 110 adjusts the voltage supplied to a particular component 130 by communicating with an adjustable supply module 120. Based on the data provided by logic 110, adjustable supply module 120 provides a corresponding voltage (Vout 140) to a component 130.

Communication between voltage adjustment logic 110 and adjustable supply module 120 occurs via control bus 150 (e.g., an I2C bus). The example embodiment of FIG. 1 uses a separate adjustable supply module 120 for each component 130, but other embodiments are contemplated in which a particular adjustable supply module 120 supplies voltage to more than one component 130.

The data values communicated to a particular adjustable supply module 120 over control bus 150 are component-specific, since different components use different voltage ranges. The data values communicated to a particular adjustable supply module 120 are also module-specific, which allows more than one implementation or type of supply module 120 to be used in system 100. More details about the data communicated over control bus 150 will be discussed below, as will a abstraction layer for describing the data.

Voltage adjustment logic 110 operates to make slight downward voltage adjustments, such that the voltage for each component 130 is always reduced as compared to normal or full voltage, but is still within specifications for that component. The result is a small reduction in power usage by each component as compared to operating at normal (unadjusted) voltages. And in contrast to conventional power saving techniques, which use full power at high utilization, the inventive techniques disclosed herein continue to save power even when component utilization increases.

Figure 2:
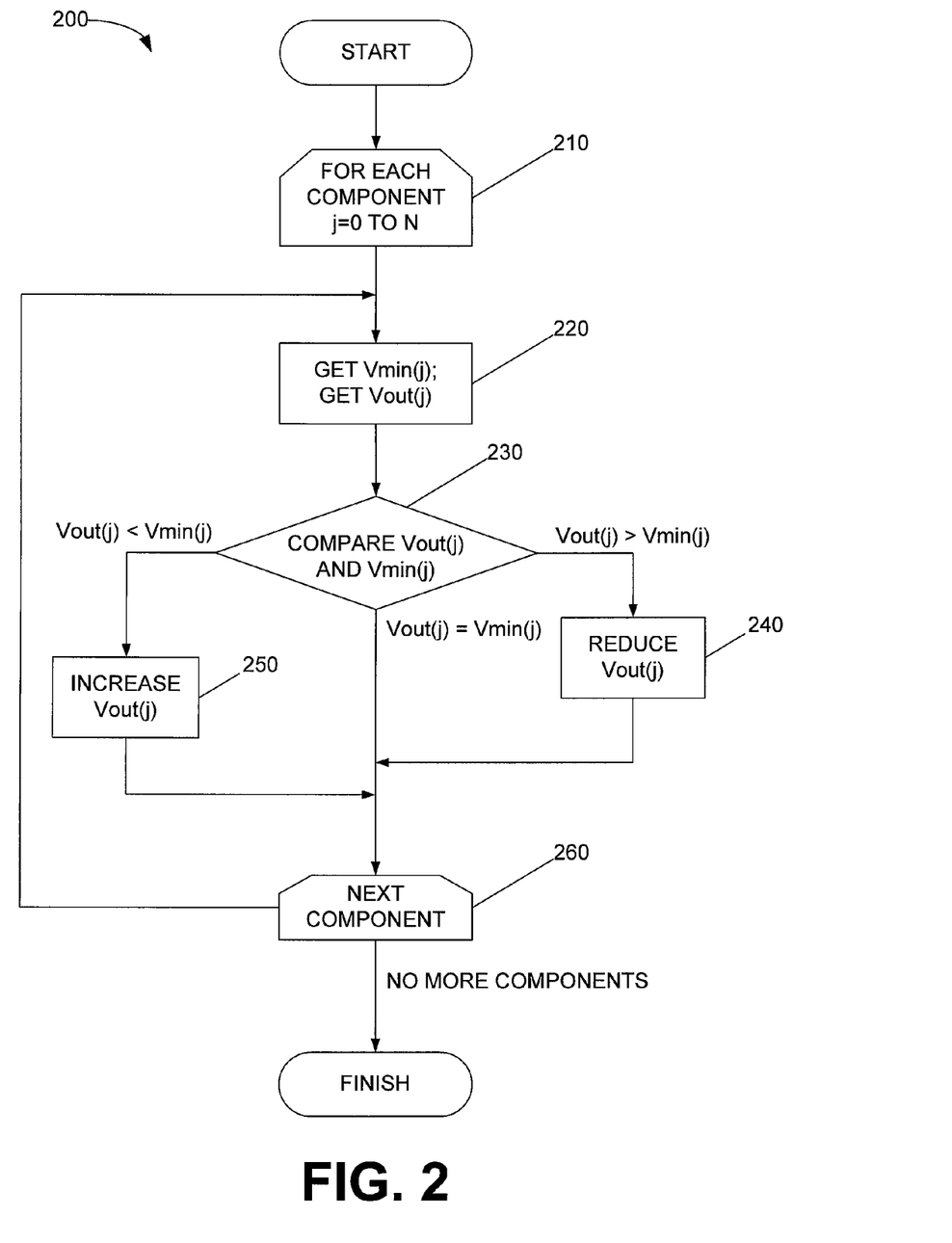
FIG. 2 is a flowchart illustrating a process for adjusting voltage as implemented by an example embodiment of the voltage adjustment logic from FIG. 1.

FIG. 2 is a flowchart illustrating a process for adjusting voltage as implemented by an example embodiment of voltage adjustment logic 110. Process 200 begins at block 210 by initializing a loop counter variable j, which is used to iterate over all the components 130. Next, at block 220 a minimum voltage value for Component(j), Vmin(j), is obtained, as is the value of Vout supplied to the current Component(j), Vout(j). At block 230 the present value of Vout(j) is compared to Vmin(j). If Vout(j) is above Vmin(j), Vout(j) is adjusted downward by a supply-module-specific step value at block 240. On the other hand, if Vout(j) is below Vmin(j), Vout(j) is adjusted upward by a supply-module-specific step value at block 250. In either case, processing continues at the end of the iteration loop (block 260, which increments counter variable j and either continues processing for the next component at block 220 or terminates the loop if all components have been processed.

The Vmin value and the step values for each component 130 depend on the component, the adjustable supply module, and the supporting circuitry, but are fixed for a particular system implementation (i.e., model). These values may be determined by block 220 by a number of mechanisms, for example, reading from storage or non-volatile memory, or querying the adjustable supply module 120 that supplies voltage to the component 130. Some implementations perform process 200 only once, during power-on self test (POST) of system 100. Other implementations perform process 200 periodically, for example, from a host processor system management interrupt (SMI) routine (on the order of every 125 ms), or from a baseboard management controller (BMC) timer routine (on the order of once a second).

In cases where process 200 is performed only during power-on self test, the Vmin value may include a guard band and thus be higher than the absolute specified minimum that would be used if process 200 ran again. This guard band keeps Vout above the absolute specified minimum even if downward variation in the voltage occurs because of temperature or load changes.

Figure 3:
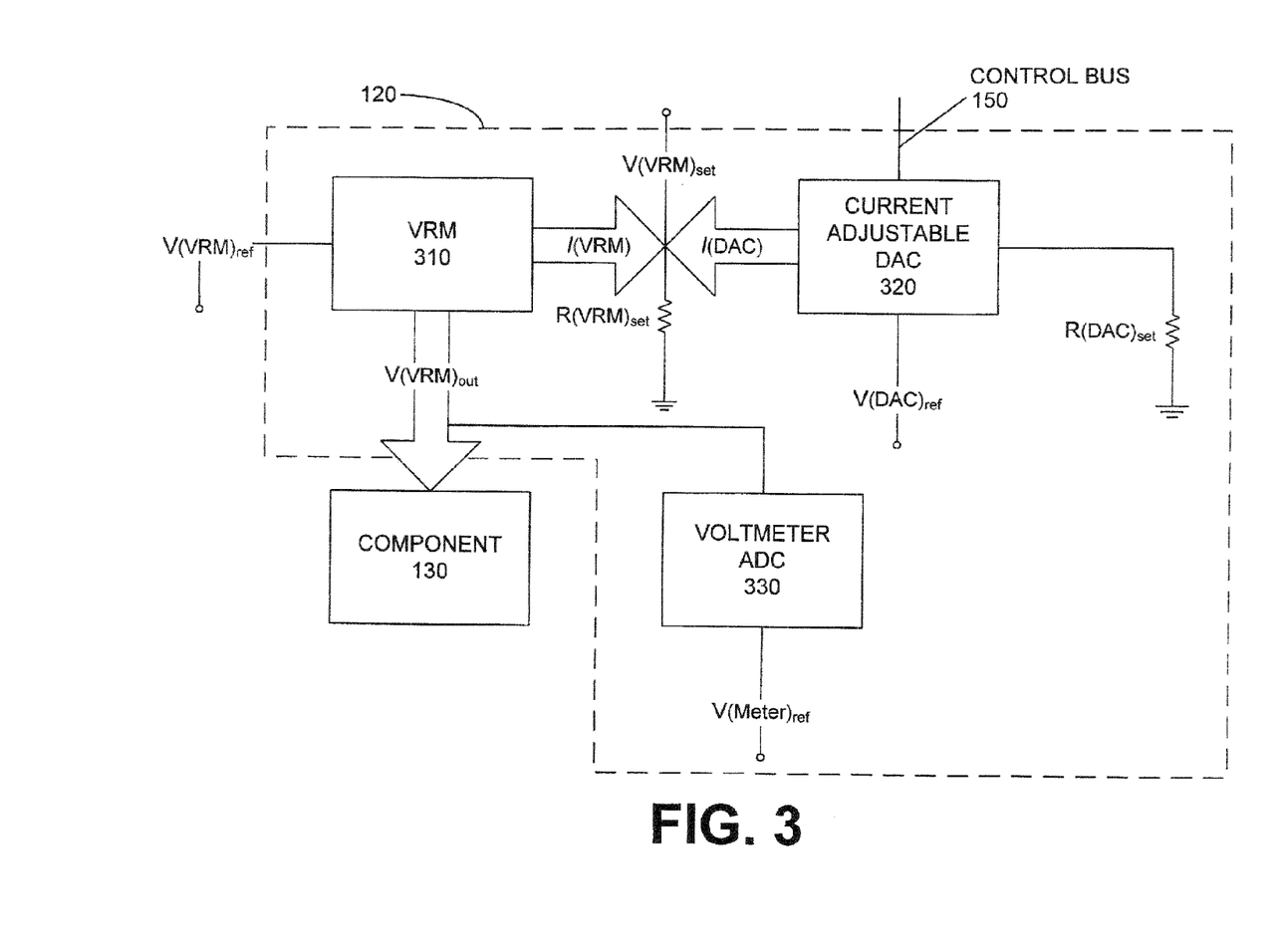
FIG. 3 is a circuit diagram which includes an embodiment of the adjustable supply module from FIG. 1.

As described earlier in connection with FIG. 1, adjustable supply module 120 supplies an adjustable amount of voltage to a component 130. FIG. 3 is a circuit diagram which includes an embodiment of adjustable supply module 120. Adjustable supply module 120 includes a voltage regulator module (VRM) 310, an adjustable current digital-analog-converter (DAC) 320, an analog-to-digital converter (ADC) 330, and supporting circuitry.

VRM 310 supplies component 130 with an appropriate regulated voltage V(VRM)$_{out}$, which is a function of two inputs, V(VRM)$_{ref}$ and V(VRM)$_{set}$. While V(VRM)$_{ref}$ is fixed, V(VRM)$_{set}$ is driven by the current output I(DAC) of DAC 320. DAC 320 receives a current setting over control bus 150 from logic 110, and based on the value of this setting, DAC 320 outputs a specific amount of current I(DAC). Thus, the current setting for DAC affects V(VRM)$_{out}$.

ADC 330 acts as a voltmeter and allows logic 110 to obtain V(VRM)$_{out}$ by reading, over control bus 150, the output of meter ADC 330. As described earlier in connection with FIG. 2, logic 110 compares the reading of V(VRM)$_{out}$ to a minimum value associated with adjustable supply module 120. Logic 110 then sets the current that is output by DAC 320 to adjust V(VRM)$_{out}$ toward the minimum, based on the comparison.

As can be appreciated by examining the circuit diagram of FIG. 3, V(VRM)$_{out}$ is related to I(DAC) as follows:

$$I(DAC) = K_{outreg} \times \frac{V(DAC)_{ref}}{R(DAC)_{fs}};$$

$$I(VRM)_{out} = \frac{V(VRM)_{set}}{R(VRM)_{set}} - I(DAC);$$

$$V(VRM)_{out} = K_{VRM} \times I(VRM)_{out}.$$

A person of ordinary skill in the art should appreciate that the dielectric constant K(DAC) is typically characterized at the time a particular adjustable supply module design is built, by instructing adjustable current DAC 320 to output different values of I(DAC), and reading V(VRM)$_{out}$ with a voltmeter.

Logic 110 writes data to the adjustable current DAC 320 over control bus 150, causing DAC 320 to output particular current values, which in turn results in a specific voltage V(VRM)$_{out}$. The values written to DAC 320 are specific to the adjustable supply module 120, and in some embodiments are stored in a table or other data structure which is accessible to logic 110. In embodiments including more than one adjustable-voltage component 130, each component may have a separate table, or the tables may be grouped in some manner into a composite table.

In some embodiments, the supply-module-specific values in the table include the DAC current value which (when written to DAC 320) results in the minimum, in-specification, voltage value for component 130. Other embodiments specify a second DAC current value which results in the maximum, in-specification, voltage value for component 130. (By including minimum and maximum, a range of acceptable voltages is specified).

In still other embodiments, DAC current stepping values are used instead of minimum/maximum, such as a series of pairs specifying a numerator and a corresponding current output for DAC 320. (Such a series is also known as a "step table") For example, suppose a particular DAC was described by this series of pairs: (0, 500), (¼, 1000), (⅔ 1500), (¾, 2000). Voltage adjustment logic 110 can use these step values directly to set V(VRM)out values of 0.5 V, 1.0 V, 1.5 V and 2.0, by writing the corresponding numerator to the DAC 320 over control bus 150. The first and last pairs in the series serve as minimum and maximum values, and the pairs in between allow logic 110 to extrapolate appropriate values for setting the current output of DAC 320 to achieve V(VRM)out values which are in between the minimum and maximum.

The supply-module-specific data may also include data used to obtain the present value of V(VRM)$_{out}$. In the embodiment of FIG. 3, this is the output of meter ADC 330. In some embodiments, this data includes a multiplier for the value read from meter ADC 330 and a meter reference value V(meter)$_{out}$. In one embodiment, V(VRM)$_{out}$ is calculated as $$V(\text{Meter})_{out}=\text{ADCReading}*V(\text{Meter})_{out}*\text{Multiplier}.$$

Some embodiments of voltage adjustment logic 110 obtain information about communicating with DAC 320 and ADC 330 from a table or data structure that is specific to control bus 150 and to adjustable supply module 120. For example, some embodiments of control bus 150 utilize device identifiers, bus identifiers, register numbers, etc. in communicating with devices on the bus, and storing this information in a table allows logic 110 to work with different DACs and ADCs with minimal modification.

FIGS. 4-9 show tables used by an example embodiment of logic 110, encapsulating supply-module-specific and control-bus-specific data. In some embodiments, table 400 is stored in read-only memory or other non-volatile memory. Table 400 contains a module descriptor 410 for each adjustable supply module 120, where each module descriptor 410 describes how to access the DAC 320 and ADC 330 over control bus 150, and also describes the range of voltage (minimum to maximum) that is valid for the voltage-supplied component 130. Other embodiments of table 400 include a minimum voltage but not a maximum.

Figure 4:
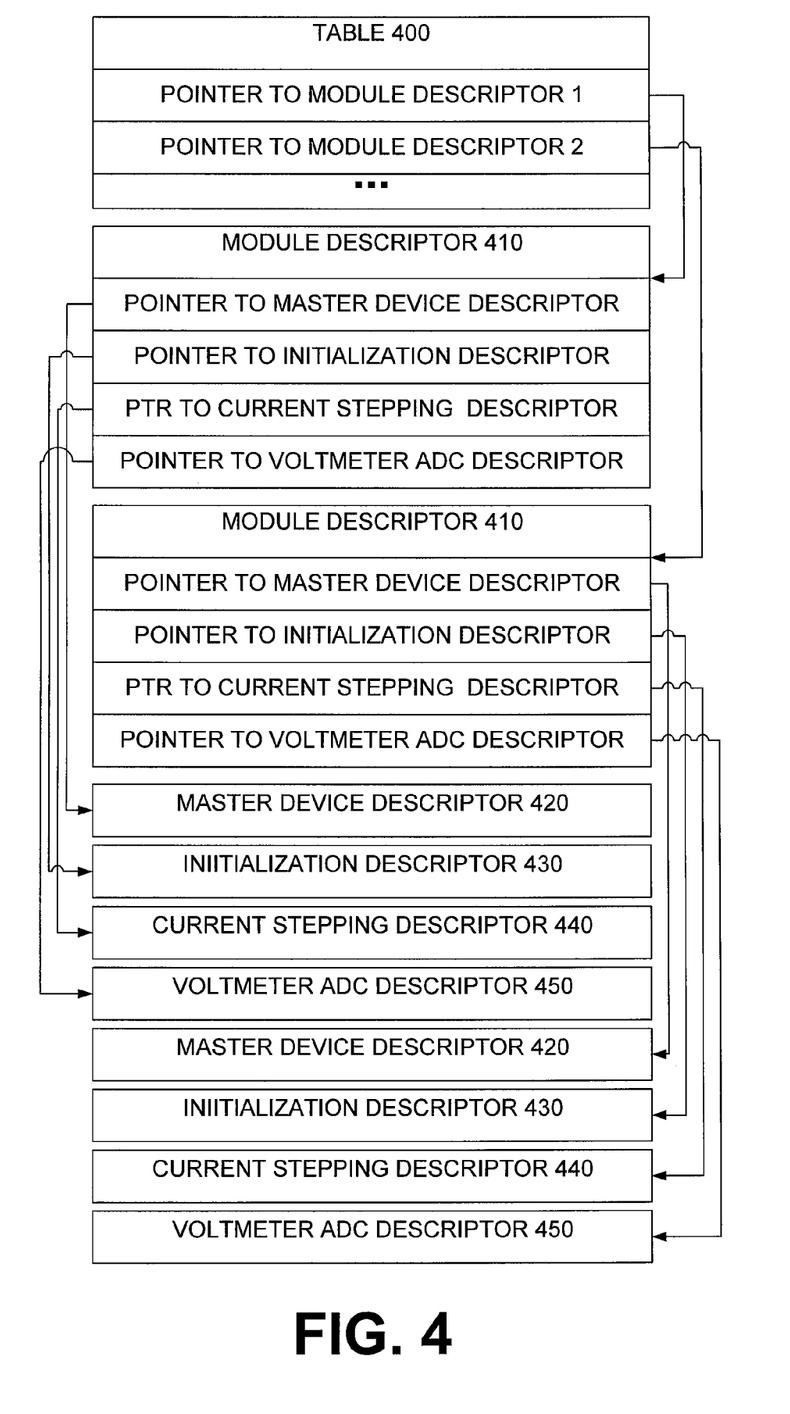
FIG. 4 illustrates table encapsulating supply-module-specific data and control-bus-specific data, in accordance with an example embodiment of the voltage adjustment logic from FIG. 1.

FIG. 4 illustrates how table 400 and its constituent parts are laid out in logical memory. Various descriptors within table 400 use offsets to "point" to other descriptors. In the example of FIG. 4, table 400 includes logical pointers to two module descriptors 410, and each module descriptor 410 contains a logical pointer to a master device descriptor 420, a logical pointer to a initialization descriptor 430, a logical pointer to a current stepping descriptor 440, and a logical pointer to a voltmeter ADC descriptor 450.

Figure 5:
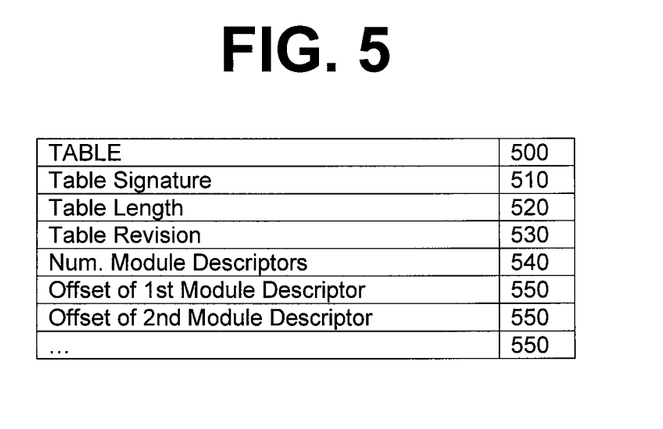
FIG. 5 illustrates several fields contained in an example embodiment of the table from FIG. 4.

Table 400 and its constituent parts will now be described in further detail. Turning to FIG. 5, table 400 starts with fields related to the table itself: a signature field 510, allowing the table to be searched for in memory, a table length field 520, and a table revision field 530 (where tables with different layouts would have different revisions). The remainder of the table describes the module descriptors 410. The number of module descriptors 540 is followed by an array of offsets 550, each specifying the location of a module descriptor 410 relative to the start of table 400.

Figure 6:
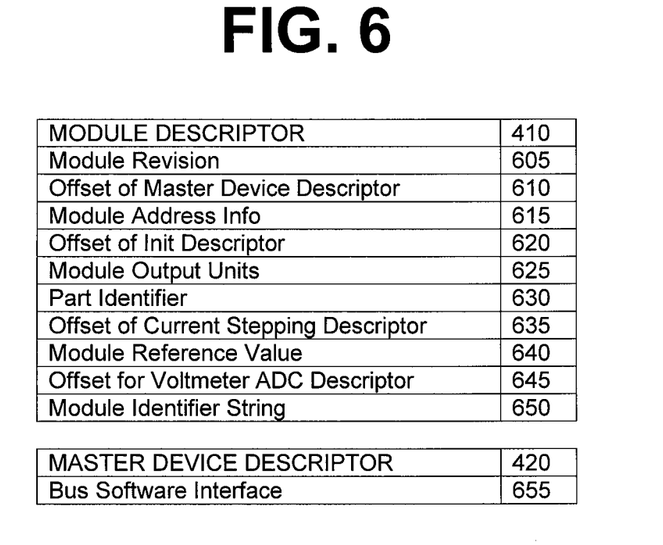
FIG. 6 illustrates an example embodiment of the module descriptor from FIG. 4.

Turning now to FIG. 6, module descriptor 410 includes: a module entry revision field 605; an offset 610 for a master device descriptor (420); module address information 615 specifying the information needed to communicate with the module 120 over control bus 150; an offset 620 for an initialization descriptor (430) used to initialize the DAC or ADC; module output units 625 (e.g., Volts, mV, kHz, MHz); a part identifier 630 (e.g., Identifying the particular DAC); an offset 635 for a current stepping descriptor 440); a module reference value 640; an offset 645 for a voltmeter ADC descriptor (450); and a string 650 identifying the module 120.

Module reference value 640 within module descriptor 410 allows logic 110 to set voltage on a relative rather than absolute basis. For example, logic 110 can set voltage to 95% of reference by multiplying reference value 640 by the fraction 95% to determine the corresponding absolute voltage. Once the absolute voltage is known, logic 110 sets the corresponding DAC current output value as given by current stepping descriptor 440.

Master device descriptor 420 module descriptor 410 describes the bus master device for control bus 150. In this example embodiment, master device descriptor 420 contains only a field 655 describing the software interface to the bus master (e.g., Intelligent Platform Management Interface or IPMI).

Figure 7:
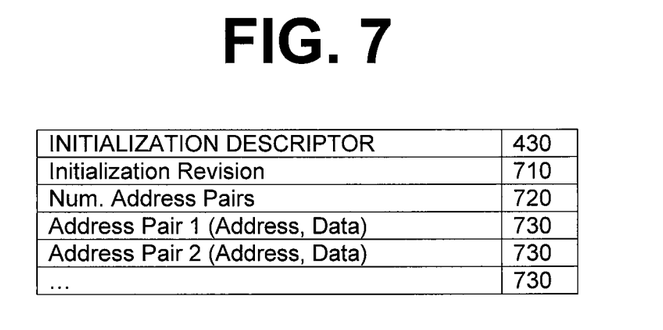
FIG. 7 illustrates an example embodiment of the initialization descriptor from FIG. 4.

FIG. 7 shows initialization descriptor 430 which is part of a module descriptor 410. Initialization descriptor 430 contains data used to initialize the particular DAC or ADC, expressed as address and data values (in pairs) to be written over control bus 150. In this example embodiment, initialization descriptor 430 includes a revision field 710, a number 720 of address-data pairs, and the pairs 730.

Figure 8:
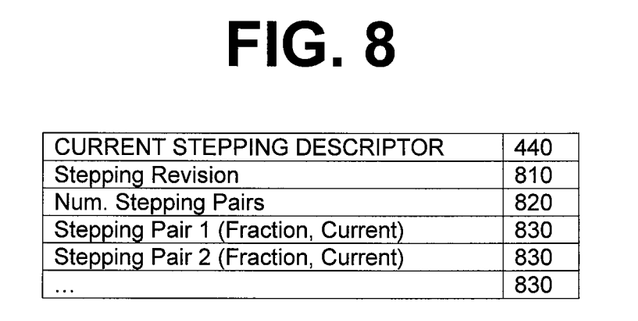
FIG. 8 illustrates an example embodiment of the current stepping descriptor from FIG. 4.

Turning now to FIG. 8, current stepping descriptor 440 describes how adjustable current I(DAC) can be output by DAC 320, expressed as pairs of fraction and current. (Use of stepping pairs was discussed earlier in connection with FIG. 3.) Stepping descriptor 440 includes a revision field 810, a number 820 of numerator-output pairs, followed by the stepping pairs 83.

Figure 9:
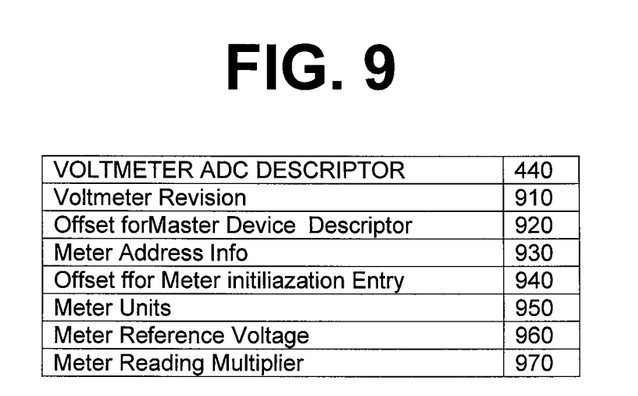
FIG. 9 illustrates an example embodiment of the voltmeter ADC descriptor from FIG. 4.

FIG. 9 shows voltmeter ADC descriptor 450, which is part of a module descriptor 410. Voltmeter ADC descriptor 450 describes how to obtain $V(VRM)_{out}$ from meter ADC 330. Voltmeter ADC descriptor 450 includes: a revision field 910; a offset 920 for the master device descriptor 420 (where the offset is relative to the start of table 400); meter address information 930 specifying the information needed to communicate with the meter ADC 330 over control bus 150; an offset 940 for an initialization entry used to initialize the meter ADC 330; meter units 950 (e.g., V, mV, kHz, MHz); meter reference voltage 960; and meter reading multiplier 970. (Meter reference voltage and multipliers were discussed earlier in connection with FIG. 3).

Figure 10:
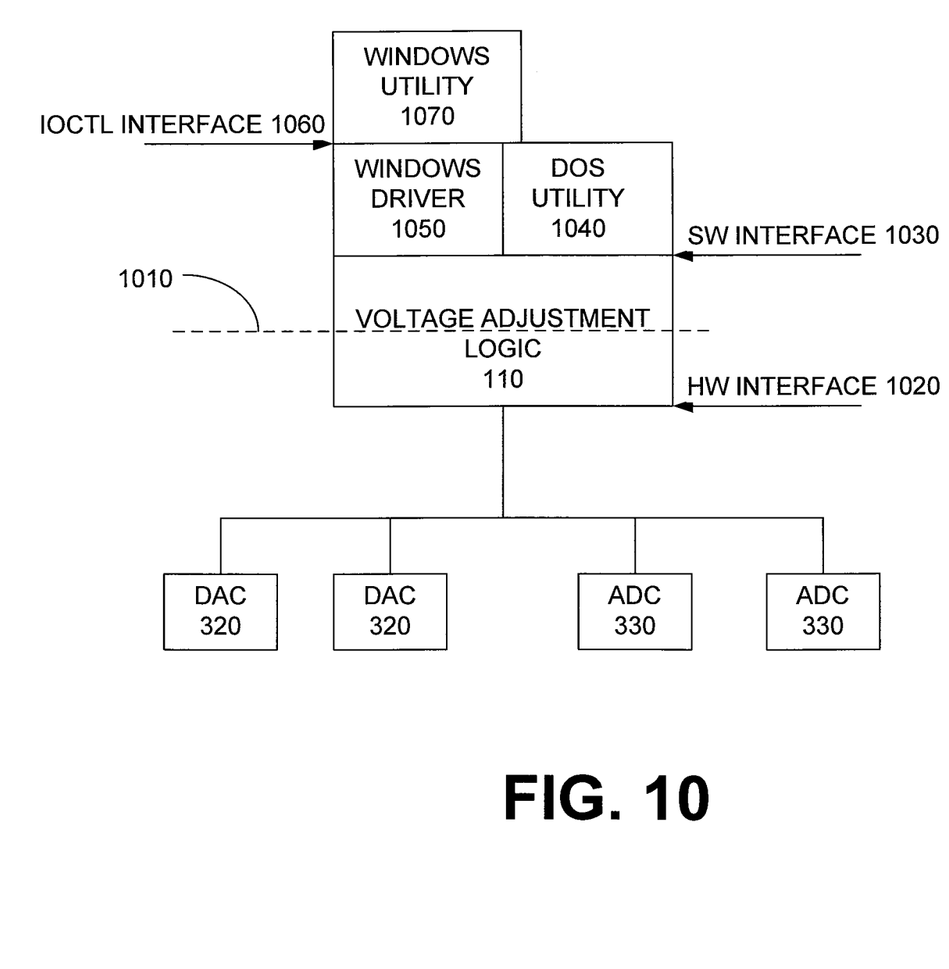
FIG. 10 is a block diagram illustrating various interfaces exposed or utilized by an example embodiment of the voltage adjustment logic from FIG. 1.

FIG. 10 is a block diagram illustrating various interfaces exposed or utilized by one embodiment of voltage adjustment logic 110. When implemented in software, voltage adjustment logic 110 can be viewed as having a software interface—through which it exposes its functionality to other software—and a hardware interface, through which it interacts with the hardware components described herein (e.g., DAC, ADC). In FIG. 10, the division between these two interfaces is represented by line 1010. Below line 1010, this example embodiment of logic 110 uses a hardware interface 1020 to communicate with adjustable supply modules 120. More specifically, in this example embodiment, hardware interface 1020 is the I2C interface, through which logic 110 reads the voltage at meter ADC 330, and sets the voltage of component 130 through DAC 320.

Above line 1010, logic 110 exposes a low-level software interface 1030 used by other software modules 1040 and 1050. In this example embodiment, the software modules are a DOS utility program 1040 and a Windows device driver 1050. The Windows device driver 1050 in turn provides an IOCTL software interface 1060 for use by a Windows utility program 1070.

As described earlier in connection with the tables in FIGS. 4-9, table 400 stores information about which ADC or DAC registers to write to, and what values to write. voltage adjustment logic 110 encapsulates the actual read and write operations, hiding the details about which I/O port or memory location the control bus master is mapped to.

Voltage adjustment logic 110 can be implemented in software, hardware, or a combination thereof. In some embodiments, logic 110 is implemented in software that is stored in a memory and that is executed by a suitable microprocessor, network processor, or microcontroller situated in a computing device. In other embodiments, logic 110 is implemented in hardware, including, but not limited to, a programmable logic device (PLD), programmable gate array (PGA), field programmable gate array (FPGA), an application-specific integrated circuit (ASIC), a system on chip (SoC), and a system in package (SIP).

Voltage adjustment logic 110 can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The flow charts herein provide examples of the operation of voltage adjustment logic 110. according to an embodiment of the present disclosure. Alternatively, these diagrams may be viewed as depicting actions of an example of a method implemented in voltage adjustment logic 110. Blocks in these diagrams represent procedures, functions, modules, or portions of code which include one or more executable instructions for implementing logical functions or steps in the process. Alternate implementations are also included within the scope of the disclosure. In these alternate implementations, functions may be executed out of order from that shown or discussed, including substantially concurrently or in reverse order, depending on the functionality involved.

The software components illustrated herein are abstractions chosen to illustrate how functionality is partitioned among components in some embodiments of a system and method for anti-aliasing a procedural texture. Other divisions of functionality are also possible, and these other possibilities are intended to be within the scope of this disclosure. Furthermore, to the extent that software components are described in terms of specific data structures (e.g., arrays, lists, flags, pointers, collections, etc.), other data structures providing similar functionality can be used instead. As just one example, a particular implementation might use a linked list instead of an array.

What is claimed is:

1. A method comprising:
   reading, over a control bus, a present value of voltage supplied to a component;
   comparing the present value of the voltage to a predetermined minimum voltage associated with the component; and
   writing, over the control bus, a setting that affects voltage provided to the component, wherein the writing is responsive to the comparing.

2. The method of claim 1, wherein writing the setting comprises writing the setting to an adjustable digital-to-analog converter.

3. The method of claim 1, wherein reading the present value of voltage comprises reading from an analog-to-digital converter.

4. The method of claim 1, wherein the method is executed by a processor during a power-on-self-test.

5. The method of claim 1, wherein the reading, comparing and writing are executed repeatedly by a system management interrupt handler executing on a processor.

6. The method of claim 1, wherein the reading, comparing and writing are executed repeatedly by a baseboard management controller.

7. A method comprising:
selecting a component from a plurality of components;
determining a minimum voltage value associated with the selected component;
obtaining a present value of voltage supplied to the selected component;
comparing the present value of the voltage for the selected component to the minimum voltage; and
responsive to the comparing, adjusting voltage that is provided to the selected component.

8. The method of claim 7, wherein the determining comprises reading the minimum voltage value associated with the selected component from a table.

9. The method of claim 7, wherein the obtaining comprises reading the present value of voltage supplied to the selected component from an analog-to-digital converter.

10. The method of claim 7, wherein the adjusting comprises setting a current which affects the voltage that is provided to the selected component.

11. The method of claim 10, further comprising reading a current value associated with the selected component from a table, wherein the setting of the current comprises writing the current value to an adjustable voltage supply module that provides voltage to the selected component.

12. The method of claim 10, further comprising reading a current value associated with the selected component from a table, wherein the setting of the current comprises writing the current value to a digital-to-analog converter.

13. An apparatus comprising:
non-volatile storage containing a plurality of values associated with an adjustable voltage supply module, one of the values comprising a minimum voltage;
memory storing program code; and
a processor programmed by the program code to:
read a value of voltage that is currently provided to a component by the adjustable voltage supply module;
compare the value of the voltage to the minimum voltage value associated with the adjustable voltage supply module; and
responsive to the comparison, adjust voltage that is provided by the adjustable voltage supply module to the component.

14. The apparatus of claim 13, wherein the plurality of values further comprise module address information, and wherein the processor is further programmed to use the module address information to read the value of voltage over a control bus.

15. The apparatus of claim 13, wherein the processor is further programmed to adjust the voltage by setting an adjustable current that affects the voltage provided by the adjustable voltage supply module to the component.

16. The apparatus of claim 13, wherein the processor is further programmed to adjust the voltage by writing over a control bus to the adjustable voltage supply module.

17. The apparatus of claim 13, wherein the plurality of values further comprise module address information, and wherein the processor is further programmed to adjust the voltage by writing over a control bus, using the module address information.

18. The apparatus of claim 13, wherein the plurality of values further comprise a current setting, and wherein the processor is further programmed to set a current within the adjustable voltage supply module in accordance with the current setting, to affect the voltage provided by the adjustable voltage supply module to the component.

19. The apparatus of claim 13, wherein the plurality of values further comprise current stepping values, and wherein the processor is further programmed to select one of the current stepping values based on the comparison and to set a current within the adjustable voltage supply module in accordance with the selected stepping value, to affect the voltage provided by the adjustable voltage supply module to the component.

20. The method of claim 1, wherein the reading comprises a voltage adjustment logic reading the present value of voltage over the control bus from an adjustable voltage supply module, and wherein the writing comprises the voltage adjustment logic writing the setting over the control bus to the adjustable voltage supply module.

21. The method of claim 7, wherein the obtaining comprises a voltage adjustment logic reading the present value of voltage over a control bus from an adjustable voltage supply module, and wherein the adjusting comprises the voltage adjustment logic writing a setting over the control bus to the adjustable voltage supply module to adjust the voltage that is provided by the adjustable voltage supply module to the selected component.

22. The apparatus of claim 13, wherein the processor is to read the value of voltage from the adjustable voltage supply module over a control bus.

* * * * *